United States Patent [19]

Schoen et al.

[11] Patent Number: 4,763,500
[45] Date of Patent: Aug. 16, 1988

[54] ROLLER TRACK MONITORING IN ROLLING MILLS

[75] Inventors: Martin Schoen, Huenxe; Horst Wuellenweber, Oberhausen; Herbert Specht, Taunusstein, all of Fed. Rep. of Germany

[73] Assignee: Mannesmann AG, Duesseldorf, Fed. Rep. of Germany

[21] Appl. No.: 889,414

[22] Filed: Jul. 24, 1986

[30] Foreign Application Priority Data

Jul. 24, 1985 [DE] Fed. Rep. of Germany ....... 3526916

[51] Int. Cl.$^4$ .............................................. B21B 37/00
[52] U.S. Cl. .......................................... 72/14; 72/250; 340/673
[58] Field of Search ..................... 72/14, 250; 340/673, 340/674, 675

[56] References Cited

U.S. PATENT DOCUMENTS

| | | | |
|---|---|---|---|
| 2,329,810 | 9/1943 | Zuschlag | 340/673 X |
| 2,513,745 | 7/1950 | Reynolds | 340/674 X |
| 3,148,563 | 9/1964 | Harley et al. | 72/14 |
| 4,536,709 | 8/1985 | Ishida | 340/675 X |

FOREIGN PATENT DOCUMENTS 178422 3/1966 U.S.S.R. ............... 340/674

Primary Examiner—Robert L. Spruill
Assistant Examiner—Steven B. Katz
Attorney, Agent, or Firm—Ralf H. Siegemund

[57] ABSTRACT

A roller track in a flat stock rolling mill facility includes rollers journalled in a frame having tranversely oriented stiffening traverses extending essentially axis parallel to the rollers, a sensing device for ascertaining absence and presence of rolled stock on the roller track, includes at least one open metallic loop mounted on a traverse in-between two rollers of the track, in a plane extending parallel to a plane of transport but below that plane and being electrically insulated from said traverse; an electric circuit is connected to the loop so that different impedance conditions of the loop are indicative of absence and presence of rolling stock in and on the roller track.

3 Claims, 1 Drawing Sheet

U.S. Patent     Aug. 16, 1988     4,763,500
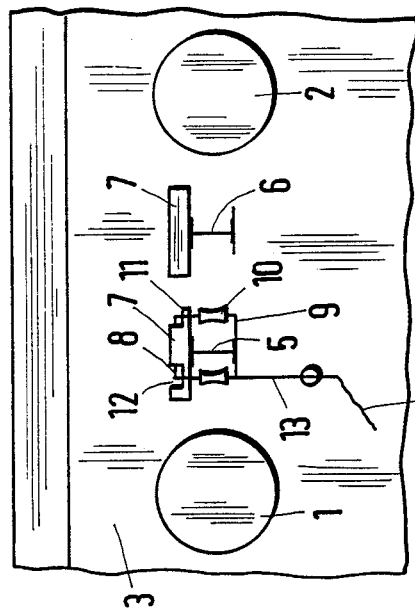
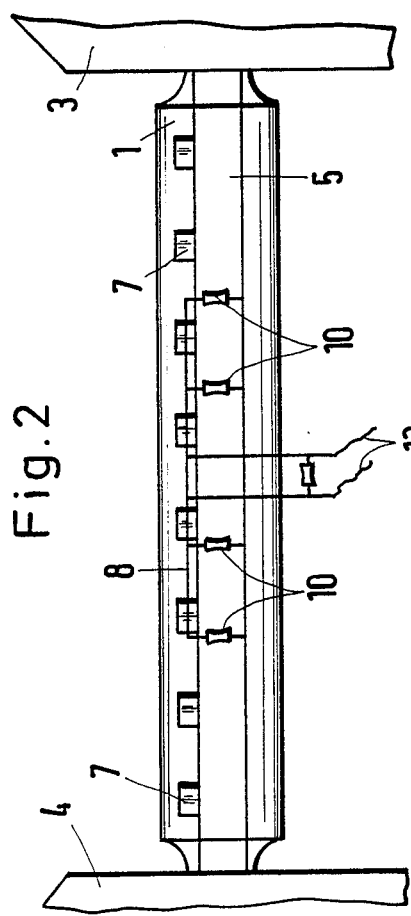
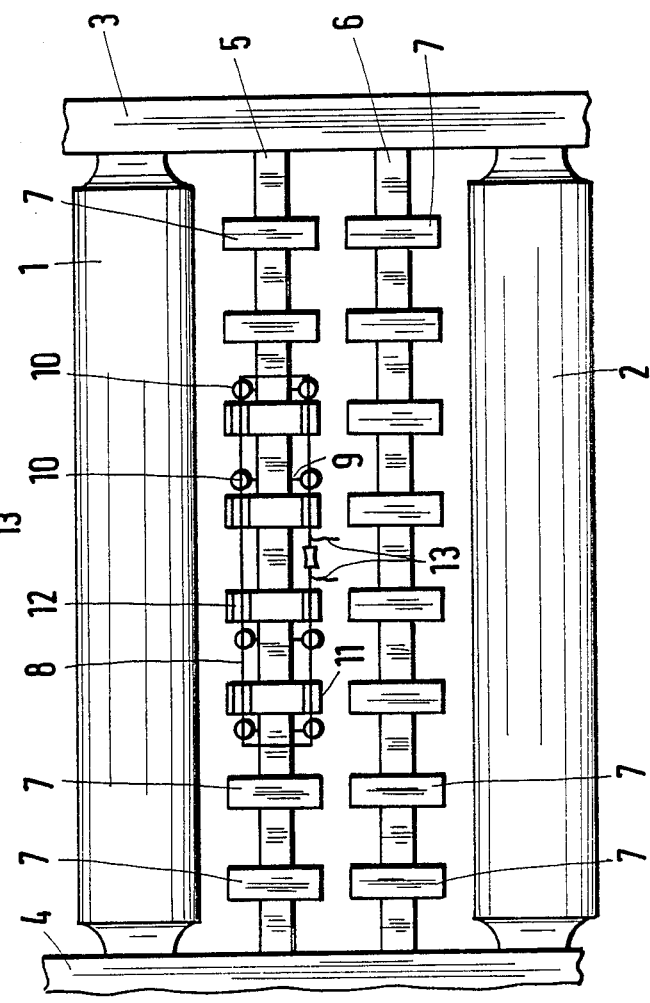

ROLLER TRACK MONITORING IN ROLLING MILLS

BACKGROUND OF THE INVENTION

The present invention relates to the detection of the beginning and the end of hot rolled stock being moved and passing on a roller track of type that is used in a rolling mill, and including an adjusting zone of the mill; the mill generally being provided for rolling flat stock, such as skelp, strip, plates, or the like.

Rolling mills of the type to which the invention pertains, particularly mills for rolling single sheets or plates include numerous pieces of equipment such as rolling stools, water cooling equipment, straightening equipment, and devices for manipulating and handling the rolling stock, all of which being controlled in some form from the position the rolling stock assumes or positions passed through during the operation, to thereby turn the respective equipment on or off. For this, then, sensing devices are included in the roller and/or conveyor track which, for example, respond to the thermal radiation of the roller stock. Alternatively, light barriers are used in that the stock, when present, interrupts the light barrier, and when absent no such interruption occurs. Optical sensors of this type, i.e. radiation sensors generally, require in either case extensive servicing particularly cleaning, because of the rough environment in which they are supposed to work. In case of a large sheet and plate stock rolling plant, the facilities that require cleaning, seemingly a simple task, are, in fact, quite extensive. Herein then one has to consider that in some instances any measurement and particularly a presentabsent detection has to be carried out when the sheet stock is hot; in other instances the temperature is quite low which requires, in fact, a different kind of systems. That is to say one cannot assume that the monitoring equipment at large is basically of a uniform construction and configuration throughout.

DESCRIPTION OF THE INVENTION

It is an object of the present invention to provide a new and improved method and equipment for detecting the beginning and end of hot roller stock or to distinguish between absence and presence of such stock in a roller track within a rolling mill, the mill being particularly provided for rolling flat sheet and plate stock, and wherein the roller tracks include frames for groups or individual rollers, some of them being driven; stiffening traverses of the frame are provided, and roll stock deflection or guiding devices may be included in order to keep the stock in a particular plane.

It is another object of the invention to provide new and improved sensing equipment within a roller track as it is used in a mill for rolling hot stock, which sensing equipment should require as little maintenance as possible, and is usable throughout regardless of the temperature of the stock, whereby high emphases is placed on reliability in the indication and measurement, such a sensor has to provide, while on the other hand care is being taken to protect these sensors as much as possible from the rolled stock.

In accordance with the preferred embodiment of the present invention, the objects are realized by providing between two adjacent rolls in the track, one or more open metallic loops being, as far as electric conduction is concerned, insulated from the frame structure of the rollers; the loop or loops extend in a plan parallel to but somewhat beneath the conveyor plane as defined by the rollers; these loops are part of an electric circuit which is responsive to impedance changes such that the principle of frequency detuning can be and will be used for ascertaining presence and passage of the beginning and/or end of rolled stock. Preferably these loops extend predominantly, transversely to the direction of rolling and the legs of the loops are placed in recesses, indentations or the like, of any rolling stock deflecting and guiding elements, that are placed in-between the rollers of the track.

The loops which are used have dimensions so that, within the system in which they are used, they inherently match the requirements of sheet stock rolling. The loops are preferably constructed from hot rolled rounds with a 20 mm diameter. Any dust, water or the like will not in the least interfere with the operation of such a loop as a tuned circuit element. The electrical connection of the loop to the detector circuit can be carried out through simple twisted communication cable for distances up to 100 m. The sensors can be used for rolling hot as well as cold sheet stock for sensing sheet stock beginning as well as sheet stock end. The stock absence/presence will be reliably recognized even if, for example, the sheet stock end has lifted off or has been bent up for some reason for several decimeter. It should also be considered that the utilization of so-called inductive sensors in other areas of technology are not comparable with the particular arrangement presently proposed, because inductive sensors usually operate with small and constant distances between stock and sensor. Presently, the sensing loops may well be placed several centimeters below the plane of rolling and conveyance, and maybe, for example, inserted in the frame stiffening, or, as stated, in stock deflecting and guiding devices arranged in-between the rollers. Even though the loops can be shaped to have a pronounced, preferred direction of extension without loss in effectiveness, it was found to be preferable to use several loops which approximate at least a square.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

FIG. 1 is a top view of a roller track for conveying flat stock into or through a rolling mill, incorporating the preferred embodiment of the present invention in accordance with the best mode thereof;

FIG. 2 is a cross-section through the device shown in FIG. 1; and

FIG. 3 is a longitudinal section through a portion of a roller track in a sheet stock rolling mill.

Proceeding now to the detailed description of the drawings, reference numeral 1 and 2 denote throughout his description two rollers being components of a track of a conveyor facility that in turn is a part of a flat stock rolling mill. These rollers are journalled in frame sides 3-4 being also a part of that mill. In-between two such rolls, i.e. 1 and 2, as well as others of the track, there are two double T-beams 5 and 6, which stiffen, so to speak, and complete the frame together with the side parts 3 and 4. The stiffening elements 5 and 6 are provided with numerous rolling stock deflectors or guides 7.

A loop 8 is provided on the carrier 5, which loop is a sensor constructed in accordance with the preferred embodiment of the invention. The arrangement includes lower support elements 9 with electrical insulators 10. The loop 8 is specifically run through cutouts or indents 11 and 12 within the deflectors 7. Reference numeral 13 refers to the electrical connection leading to the loop 8.

Upon comparing, particularly FIGS. 1 and 2, one can discern the orientation of the loop as such as well as the fact that its predominant direction of extension is along the, for example, axis of the rollers 1 and 2, that is transversely to the direction of conveying.

The loop 8 constitutes an inductive element in an electric circuit 15 such that is is a determining component, for example, of particular resonance frequency within that circuit. Conceivably, the absence of rolled stock on the conveyor causes the circuit to oscillate at a resonance frequency, yielding a particular output value in the indicating instrument 16. Now, as soon as steel stock passes over the loop, the inductivity of loop 8 will be detuned such that resonance conditions are not longer present in the circuit 15, and the output voltage generated will change accordingly. In principle, however, it makes no difference whether or not resonance conditions are established for the presence or the absence of sheet stock with detuning occurring in the opposite instance.

The loop is made, as stated above, from hot rolled rounds with a 20 mm diameter. Even though dust and water is expected to appear in great abundance in-between the rollers, they will not effect the sensing, because the absence and presence conditions of flat steel stock right above the loop and extending extensively over a substantial length of the width of the roller track, will effect the inductance of that loop to a significantly greater extent than any dust, water, even shavings could possibly do.

The invention is not limited to the embodiments described above, but all changes and modifications thereof, not constituting departures from the spirit and scope of the invention, are intended to be included.

We claim:

1. In a roller track being a part of a flat stock rolling mill facility and including rollers mounted and journalled in a frame, there being transversely oriented stiffening traverses extending essentially in axis parallel relation to the rollers, a sensing device for ascertaining absence and presence of rolled stock on the roller track, comprising:

at least one open metallic loop mounted on at least one of said traverses in-between two rollers of the track, in a plane extending parallel to a plane of conveying and transport but being situated below said plane and being electrically insulated from said traverse; there being no loop above the plane of transport; and an electric circuit connected to said loop such that the loop constitutes an impedance determining component of said circuit so that different impedance conditions are indicative of absence and presence of rolling stock in and on said roller track.

2. The improvement as in claim 1 wherein said loop has a direction of predominant extension, the direction being transverse to the direction of roller track operation and, parallel to axes of said rollers.

3. The method of sensing absence and presence of flat rolled stock in a rolling mill and in a particular location on a roller track running that mill comprising the steps of:

placing an open electrically conductive loop in-between two rollers of the track, parallel to but underneath a conveyor plane as defined by the rollers; and connecting the loop to a circuit that is responsive to inductance changes on account of absence and presence of rolled stock above the loop.

* * * * *